(12) United States Patent
Ersoy et al.

(10) Patent No.: US 7,766,354 B2
(45) Date of Patent: Aug. 3, 2010

(54) WHEEL SUSPENSION FOR A VEHICLE

(75) Inventors: Metin Ersoy, Walluf (DE); Andreas Gärtner, Bremen (DE); Thomas Rosemeier, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 406 days.

(21) Appl. No.: 11/908,534

(22) PCT Filed: Mar. 14, 2006

(86) PCT No.: PCT/DE2006/000450
§ 371 (c)(1),
(2), (4) Date: Sep. 13, 2007

(87) PCT Pub. No.: WO2006/097079
PCT Pub. Date: Sep. 21, 2006

(65) Prior Publication Data
US 2008/0174083 A1 Jul. 24, 2008

(30) Foreign Application Priority Data
Mar. 15, 2005 (DE) .................. 10 2005 012 245

(51) Int. Cl.
*B60G 3/18* (2006.01)
(52) U.S. Cl. .................. 280/124.138; 280/124.135; 280/124.136

(58) Field of Classification Search .......... 280/124.138, 280/124.135, 124.136, 124.141; 73/862.541, 73/862.041, 862.042, 862.043
See application file for complete search history.

(56) References Cited

U.S. PATENT DOCUMENTS

| 5,821,434 A | 10/1998 | Halliday |
| 2004/0190805 A1 | 9/2004 | Ersoy et al. |
| 2005/0007225 A1 | 1/2005 | Kruse et al. |

FOREIGN PATENT DOCUMENTS

| DE | 42 01 146 A1 | 7/1992 |
| DE | 101 10 738 C1 | 11/2002 |
| DE | 101 34 259 A1 | 2/2003 |
| WO | WO 2005/021298 A1 | 3/2005 |

*Primary Examiner*—Eric Culbreth
(74) *Attorney, Agent, or Firm*—McGlew and Tuttle, P.C.

(57) ABSTRACT

A wheel suspension is provided for a vehicle (7), with a carrier element (5), a wheel carrier (1) arranged at a spaced location from the carrier element (5) and a wheel (14) mounted rotatably on the wheel carrier (1). The wheel carrier (1) is connected to the carrier element (5) via a first guide (3; 17) and a first pivotable connection (10) and the wheel carrier (1) is connected to the carrier element (5) via a second guide (2; 4) and a second pivotable connection (8; 12). A first angle-measuring device (27, 28) is integrated in the first pivotable connection (10) and a second angle-measuring device (44, 45) is integrated in the second pivotable connection (8; 12).

5 Claims, 6 Drawing Sheets

WHEEL SUSPENSION FOR A VEHICLE

CROSS REFERENCE TO RELATED APPLICATIONS

This application is a United States National Phase application of International Application PCT/DE2006/000450 and claims the benefit of priority under 35 U.S.C. §119 of German Patent Application DE10 2005 012 245.0 filed Mar. 15, 2005, the entire contents of which are incorporated herein by reference.

FIELD OF THE INVENTION

The present invention pertains to a wheel suspension for a vehicle, with a carrier element, a wheel carrier arranged at a spaced location from the carrier element and a wheel mounted rotatably on the wheel carrier, wherein the wheel carrier is connected to the carrier element via a first guide means and a first pivotable connection means, and the wheel carrier is connected to the carrier element via a second guide means and a second pivotable connection means.

BACKGROUND OF THE INVENTION

Such wheel suspensions are known from the state of the art. The operating point of the wheel or tire is determined in modern electronic stability control systems with the aid of measured variables in a model-supported manner, so that the load factor of the wheel or tire force potentials can be determined approximately at a given slip. However, the wheel load or the exact wheel or tire position in relation to the vehicle body construction, which is defined especially by the values of the king pin angle and the track, is not included in the calculation or is included only inaccurately, so that there are drawbacks in terms of accuracy and validity, as a result of which the performance capacity of the electronic stability control system cannot be fully utilized.

SUMMARY OF THE INVENTION

The object of the present invention is to perfect a wheel suspension of the type mentioned in the introduction such that the load factor of the wheel or tire force potential can be determined with a higher accuracy.

The wheel suspension according to the present invention for a vehicle has a carrier element, a wheel carrier arranged at a spaced location from the carrier element and a wheel mounted rotatably on the wheel carrier, wherein the wheel carrier is connected to the carrier element via a first guide means and a first pivotable connection means and wherein the wheel carrier is connected, furthermore, to the carrier element via a second guide means and a second pivotable connection means. A first angle-measuring device is integrated here in the first pivotable connection means and a second angle-measuring device is integrated in the second pivotable connection means.

It is possible with the wheel suspension according to the present invention, for example, to determine the king pin angle, the track angle and/or the wheel load acting on the wheel from measured values that are recorded in the wheel suspension itself, i.e., in the relative or immediate vicinity of the wheel. If the geometry of the wheel suspension is known and its dynamic characteristic is possibly known as well, the king pin angle, the track angle as well as the wheel load acting on the wheel can be determined by two angle measurements at different locations of the wheel suspension with greater accuracy than before, preferably directly in the wheel suspension. The angle measurement with the first angle-measuring device describes here the pivoting and/or twisting of the first guide means in relation to the wheel carrier or the carrier element. Furthermore, the angle measurement with the second angle-measuring device describes the pivoting and/or twisting of the second guide means in relation to the wheel carrier or the carrier element. Since the king pin angle, the track angle and/or the wheel load also determine the load factor of the wheel or tire force potential, this can also be determined with a greater accuracy.

Furthermore, the wheel carrier may also be connected to the carrier element via additional guide means and pivotable connection means.

The first pivotable connection means is preferably designed as a ball and socket joint, via which, e.g., the first guide means is connected pivotably and rotatably to the wheel carrier. The first guide means may be connected to the carrier element on the carrier element side via an elastomer bearing or a spherical joint.

A spherical joint shall be defined here especially as an elastomer or rubber joint, which is movable in the directions of space as a ball and socket joint. The joint may have an inner part and an outer part for this, the inner part being arranged in the outer part via the intermediary of an elastomer body. A ball and socket joint is also suitable, in principle, for use as a spherical joint. However, shocks occurring on the wheel can be transmitted in this case to the carrier element and hence to the body of the vehicle nearly without absorption.

The second pivotable connection means is preferably likewise designed as a ball and socket joint, via which, e.g., the second guide means is connected pivotably and rotatably to the wheel carrier. The second guide means may be connected to the carrier element on the carrier element side via an elastomer bearing or a spherical joint.

The angle-measuring devices can measure at least one cardanic angle, but especially two cardanic angles and/or a twisting or preferably also at least one rotatory angle.

The first guide means may be a radius arm, but the first guide means is preferably a suspension arm or a transverse rocker. Furthermore, the second guide means may be designed as a track rod or likewise as a suspension arm. If the second guide means is a suspension arm, this preferably forms an upper suspension arm, whereas the first guide means may be designed as a lower suspension arm or as a lower transverse rocker.

The angle measurement with the angle-measuring devices is based preferably on a magnetic principle of measurement, because this has proved to have an extremely low fault liability and to be reliable in the area of motor vehicles. Therefore, any angle-measuring device has especially at least one magnet and at least one magnetic field-sensitive sensor, i.e., e.g., a magnetoresistive sensor or a sensor operating according to the Hall principle. When such an angle-measuring device is integrated in a ball and socket joint or spherical joint, the magnet is preferably seated in the joint ball, whereas the magnetic field-sensitive sensor may be arranged in the ball and socket joint housing accommodating the ball joint or vice versa.

To increase the accuracy with which the king pin angle, the track angle and/or the wheel load acting on the wheel are determined, the first pivotable connection means and the second pivotable connection means are preferably located at spaced locations from one another.

The two angle-measuring devices are connected especially electrically to an evaluating device, by which the track angle, the king pin angle and/or the wheel load currently acting on the wheel or an approximate value thereof can be determined on the basis of or with the inclusion of the measured values provided by the angle-measuring devices.

The first guide means may be connected, furthermore, to the carrier element via one or more force elements, e.g., via a spring and/or an absorber, wherein the spring rate of the spring as well as the absorbing rate of the absorber can be used to determine the wheel load or the approximate value thereof. In particular, the spring and the absorber are combined in a spring-absorber unit. However, such a spring-absorber unit is not absolutely necessary, because only a relationship is established between a spring deflection position or rate of spring deflection and the characteristic of the force element from the viewpoint of calculation for the determination of the wheel load or the approximate value thereof.

The wheel is preferably in contact with a substrate, e.g., a road surface, the wheel load extending especially at right angles to the substrate and in parallel to the vertical axis of the vehicle and is formed at least proportionately by a force a) that acts from the carrier element or the vehicle body on the wheel. Furthermore, the wheel load regularly has two additional force components b) and c), of which a first additional force component (b) is determined by the weight of the wheel itself. The force component b) can be added to the force a) and it does not usually change. The force component b) may not possibly be determined by means of the two angle-measuring devices and is determined separately. The second additional force component c) is determined by the inertias of masses of the wheel during a corresponding motion or acceleration. Depending on the requirement imposed in terms of accuracy, the wheel load can thus be approximated or determined by the force component a) alone or additionally by one or both of the force components b) and c).

The wheel load is clearly the current force that acts between the tire contact area and the road in the vertical direction or in the direction of the vertical axis of the vehicle. The force component a) can be determined by means of the angle-measuring devices, adding the force component b) as an offset. If higher requirements are imposed on accuracy, an acceleration sensor may additionally be installed, so that the dynamic force component c) can be determined and is also taken into account when determining the wheel load.

If the wheel is a first wheel of a wheel axle having two wheels, and a stabilizer, especially a roll stabilizer is provided at the axle, the spring deflection difference between the two wheels can also be included in another force component d) in order to determine the individual wheel load.

The present invention pertains, furthermore, to a vehicle, especially a motor vehicle, with a vehicle body construction and at least one wheel suspension according to the present invention, wherein the carrier element is part of the vehicle body construction. The wheel suspension may be varied according to all the above-mentioned embodiments. In particular, it is possible to provide the vehicle with a plurality of wheel suspensions according to the present invention and preferably with four wheel suspensions according to the present invention. The carrier elements of the particular wheel suspensions may be rigidly connected to one another or may pass over into one another.

The present invention pertains, furthermore, to the use of a wheel suspension according to the present invention or a process for using same, wherein a first measured value is determined by means of the first angle-measuring device, a second measured value is determined by means of the second angle-measuring device, and the track angle and the king pin angle of the wheel are determined on the basis or with the inclusion of these two measured values. The wheel suspension may be varied according to all the above-mentioned embodiments in this case as well. The wheel load acting on the wheel or an approximate value therefore and/or the lateral force acting on the wheel, which can, however, also be detected by a separate sensor, can now also be determined on the basis or with the inclusion of the two measured values.

The lateral acceleration and the speed of the wheel or of the vehicle can additionally also be measured or determined from measurements, for which additional sensors may be arranged in the wheel suspension or in the vehicle. For example, the king pin inclination of the wheel can then be determined on the basis or with the inclusion of the track angle, the king pin angle, the lateral acceleration and the speed. A vehicle stability single-track model, which can be implemented, e.g., with a digital computer, has proved to be suitable for this. The electronic or logic unit, in which the king pin inclination can be determined, will hereinafter be called the estimator unit. If a plurality of wheels are connected to the vehicle body construction via wheel suspensions according to the present invention, the king pin inclinations can be determined individually for each wheel.

Furthermore, it is possible to determine, e.g., the remaining force reserve of the wheel and/or the current coefficient of friction between a road surface and the wheel that is in contact with the road surface on the basis or with the inclusion of the king pin inclination. A digital computer, which has a memory, in which, e.g., at least one tire characteristic diagram per wheel or a plurality of tire characteristic diagrams for different coefficients of friction can be stored as data for the wheel or for a plurality of wheels, but preferably for all wheels, may be provided for this. The electronic or logic unit, in which the tire characteristic diagram or the tire characteristic diagrams can be stored and evaluated, will hereinafter be called a tire characteristic diagram unit. The tire characteristic diagram unit can determine, e.g., the current working point of the wheel or tire in the tire characteristic diagram, from which the current load factor of the wheel or tire force potential can be derived. Possible concrete results of this load factor are then, e.g., the above-mentioned remaining force reserve of the wheel and/or the current coefficient of friction between the road surface and the wheel.

The estimator unit and/or the tire characteristic diagram unit are preferably designed as a computing unit (e.g., as a digital or analog computer) and may be integrated in the evaluating device or formed by same. If the evaluating device has a digital computer, the latter may assume, e.g., the functions and tasks of the estimator unit and/or the tire characteristic diagram unit.

A tire characteristic diagram can be defined here as the dependence of the lateral force on the king pin inclination at different wheel loads. A tire characteristic diagram is represented, e.g., as an arrangement of graphic curves in a system of coordinates, wherein a single one of the curves of that arrangement shows that at a constant wheel load, the king pin inclination is plotted on the abscissa and the corresponding lateral force on the ordinate or vice versa for a wheel or for a tire. Different curves can then be determined for different wheel loads, for which the above-mentioned arrangement of curves or the characteristic diagram is obtained, which can also be stored in the memory of the tire characteristic diagram unit in the form of data. Furthermore, such a characteristic diagram is preferably determined for a constant coefficient of friction, so that different characteristic diagrams can also be obtained and stored in the memory for different coefficients of friction.

The relative position of the wheel carrier in relation to the carrier element or to the vehicle body construction, especially the variable track [angle] and king pin angle as well as approximately and additionally the wheel load are determined by means of the intelligent angle sensor system, which determines the cardanic and/or rotatory angles of chassis joints by measurement and processes them for use by different chassis control systems. The field line direction of a calibrated magnet in a steel carrier is measured relative to the sensor in the case of the magnetoresistive principle of measurement employed, so that it is possible to determine relative rotations between the magnet and the sensor in a wide angle range with high resolution. The intelligent angle joint is formed by the integration of a sensor system with different types of joints or with joints located at different sites. The effective working point of one wheel or tire or of all four wheels or tires is determined in the wheel or tire characteristic diagram individually for each wheel in the knowledge of the above-described variables and other variables, which are usually determined by other sensors, e.g., speed, yaw rate, longitudinal acceleration, lateral acceleration and wheel slip, by means of an electronic observer model, which can be implemented in the evaluating device, so that the particular wheel force transmission potential can be outputted to a higher-level control system or a plurality of higher-level control systems via a signal output.

An input variable (e.g., king pin inclination or longitudinal slip) can be used as a variable for determining the working point, and the measured or calculated input variables (e.g., wheel load) make at the same time possible the characteristic diagram-based output of a result value (e.g., horizontal force characteristic diagram). This [value] may deviate at first very greatly from the really measured horizontal force value, because, e.g., the variable is increased further with small increments starting from the value 0, but it will then approach the target value after several steps. When the tolerance drops below an error tolerance set before, the working point (variable value) can be read.

The present invention will be described below on the basis of a preferred embodiment with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
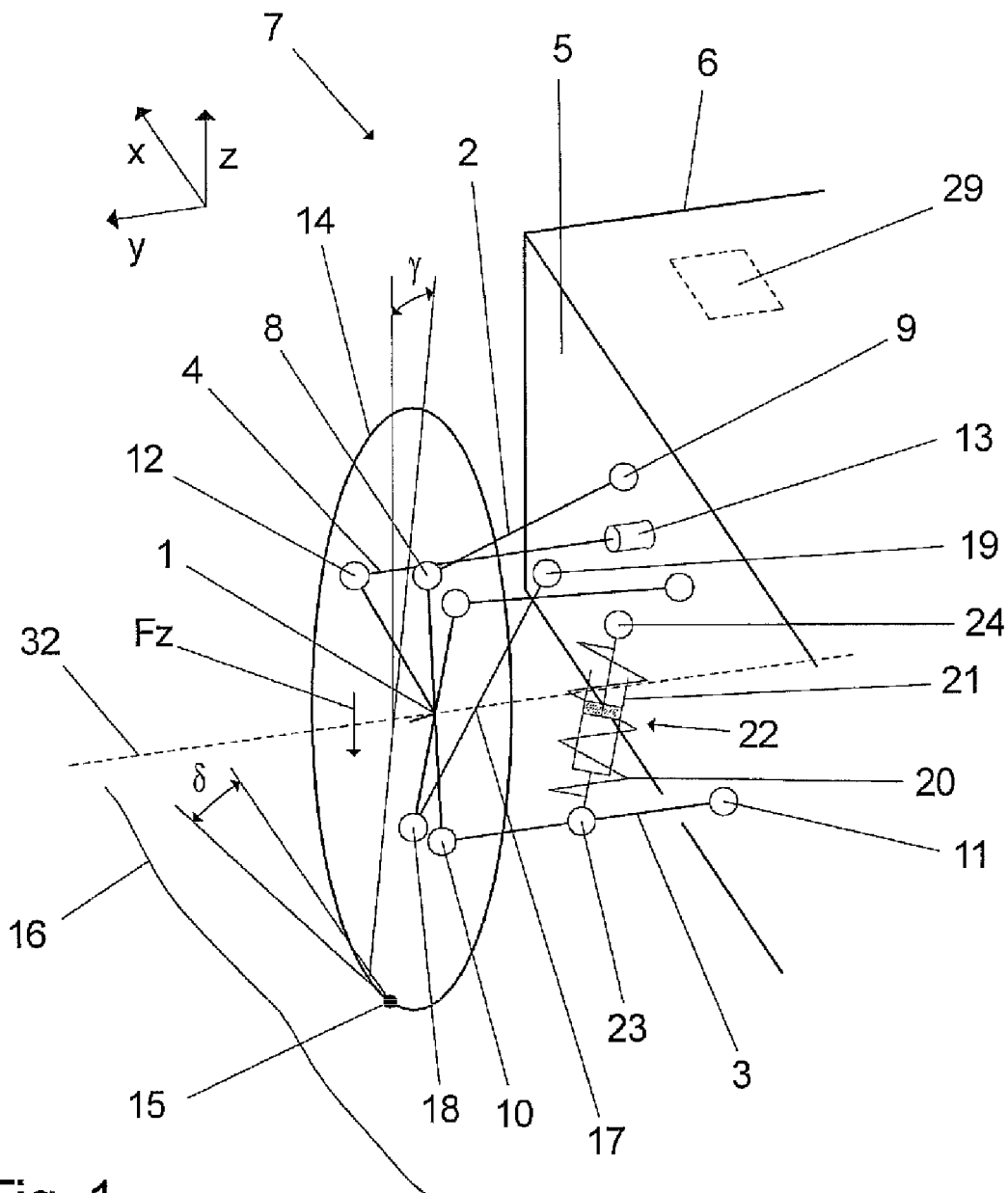
FIG. 1 is a schematic view of an embodiment of the wheel suspension according to the present invention.

Referring to the drawings in particular, FIG. 1 shows a schematic view of an embodiment of the wheel suspension according to the present invention, in which a wheel carrier 1 is connected to a carrier element 5, which is part of a vehicle body construction 6 of a motor vehicle 7, which is shown partially, via an upper suspension arm 2, a lower suspension arm 3 and a track rod 4. The upper suspension arm 2 is connected to the wheel carrier 1 via a ball and socket joint 8 and to the carrier element 5 via an elastomer bearing or spherical joint 9. The lower suspension arm 3 is connected to the wheel carrier 1 via a ball and socket joint 10 and to the carrier element 5 via a spherical joint or elastomer bearing 11. Furthermore, the track rod 4 is connected to the wheel carrier 1 via a ball and socket joint 12 and to the carrier element 5 via an adjusting device (track adjustment) 13, the track rod 4 being displaceable in its longitudinal direction and able to be fixed in a desired position by means of the adjusting device 13. The wheel carrier-side ball and socket joints 8, 10 and 12 are located at spaced locations from one another. Furthermore, the bearing or joint 9 as well as the bearing or joint 11 and the adjusting device 13 are located at spaced locations each from one another on the carrier element side.

A tire or wheel 14, which is in contact with a road surface 16, shown schematically, in a wheel contact point 15, is mounted rotatably on the wheel carrier 1. Furthermore, the wheel carrier 1 is connected via a radius arm 17 to the carrier element 5, which is articulated or connected to the wheel carrier 1 via a ball and socket joint 18 and to the carrier element 5 via a spherical joint or elastomer bearing 19. The lower suspension arm 3 is additionally connected to the carrier element 5 via a spring 20 and a shock absorber 21, the spring 20 and the shock absorber 21 forming together a spring-absorber unit 22. However, it is possible, in principle, to arrange the force elements spring and/or absorber between the carrier element 5 and the wheel carrier 1 anywhere in the wheel suspension or separately or in a coupled form. The directions in space x, y and z are indicated in a system of coordinates.

Figure 2:
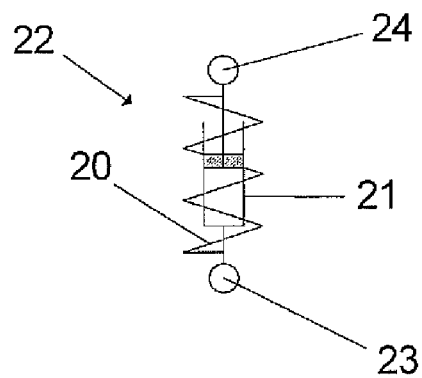
FIG. 2 is a schematic view of the spring-absorber unit according to FIG. 1.

FIG. 2 shows the spring-absorber unit 22, which has respective joints 23 and 24 at its ends, the spring-absorber unit 22 being fastened via the joint 23 to the lower suspension arm 3 in a position between the ball and socket joint 10 and the bearing or joint 11 and being attached to the carrier element 5 via the joint 24. The spring rate of the spring 20 will hereinafter be designated by c and the rate of absorption of the shock absorber 21 will hereinafter be designated by k.

Figure 3:
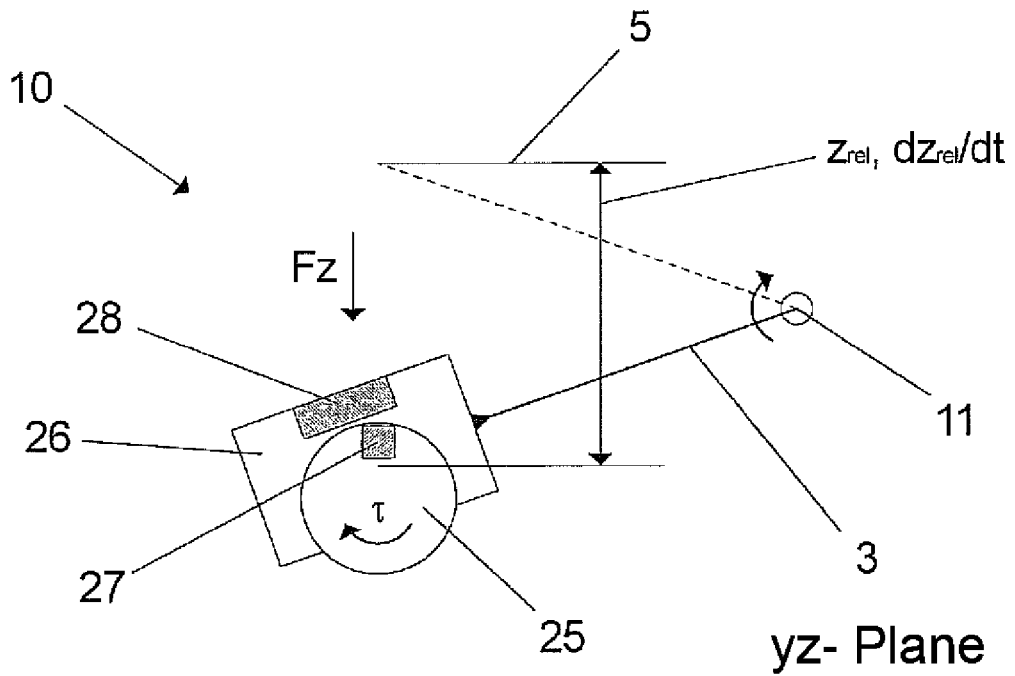
FIG. 3 is the lower suspension arm according to FIG. 1 with a schematic view of a first ball and socket joint with integrated angle-measuring device.

FIG. 3 shows a schematic view of the ball and socket joint 10, which has a ball pivot 25 and a ball and socket joint housing 26, in which the ball pivot 25 is mounted rotatably and pivotably. A permanent magnet 27 is arranged in the ball pivot 25, whereas a magnetic field-sensitive sensor 28 is arranged in the ball and socket joint housing 26. The magnet 27 and the magnetic field-sensitive sensor 28 together form a first angle-measuring device, which is integrated in the ball and socket joint 10. As an alternative, the angle-measuring device formed from the magnet 27 and the magnetic field-sensitive sensor 28 may also be integrated in the spherical joint 19. The ball and socket joint housing 26 is connected especially rigidly to the lower suspension arm 3, whereas the ball pivot 25 is preferably connected rigidly to the wheel carrier 1 or vice versa. An approximate value can be determined for the wheel force $F_Z$ or $F_{ZWHEEL}$ acting on the wheel 14 or on the wheel carrier 1 by means of the angle τ obtained by means of the first angle-measuring device, which angle is assumed by the lower suspension arm 3, e.g., in the yz plane relative to the wheel carrier 1, the time derivative of this angle as well as the spring rate c and the rate of absorption k.

In particular, the following is approximately true: $F_Z = j^2*(c)*z_{rel} + k*dz_{rel}/dt$), in which the variable j represents, e.g., the path or force transmission ratio between the wheel carrier and the force element. Instead of this approximate determination of $F_Z$, it is also possible to perform a more accurate calculation of $F_Z$ or $F_{ZWHEEL}$, which will be explained later. The variable j is calculated, for example, in a spring arm (e.g., 3) from the ratio of the overall arm length (e.g., section between 10 and 11) and the longitudinal section (e.g., section between 23 and 11) between the force element articulation (e.g., 23) and the body-side mount (e.g., 11). Consequently, if the joint, which connects the spring and the arm, is arranged exactly at half of the arm length, j=0.5, i.e., only 50% of the wheel deflection are converted into a deflection of the spring. Analogously hereto, the spring forces are especially twice the wheel-related spring forces. Furthermore, $z_{rel}$ in this formula means the wheel deflection position and represents the distance between the wheel carrier 1 and the carrier element 5 in the direction z of space, where this distance or $z_{rel}$ can be determined by means of the angle or angles measured with the first angle-measuring device. In particular, $z_{rel}$ is obtained as the difference between the z position $Z_{BODY}$ of the body or carrier element and the z position $Z_{WHEEL}$ of the wheel or wheel carrier, with $z_{rel} = Z_{BODY} - Z_{WHEEL}$. The term $dz_{rel}/dt$ means the time derivative of the wheel deflection position, where the variables $z_{rel}$ as well as $dz_{rel}/dt$ can be derived from the angle or angles measured by means of the first angle-measuring device or from the time derivative thereof. Even though the angle τ is here the angle that the lower suspension arm 3 preferably assumes in the yz plane relative to the wheel carrier 1, where y and z are the correspondingly designated directions in space, y may also represent, as an alternative, the direction of the main axis of the arm in the yz plane term. An evaluating device 29, which is arranged in the vehicle body construction 6 in this embodiment and has especially a differentiating member, is used to determine or calculate the wheel load $F_z$ or an approximate value thereof. The first angle-measuring device is electrically connected to the evaluating device 29.

Figure 4:
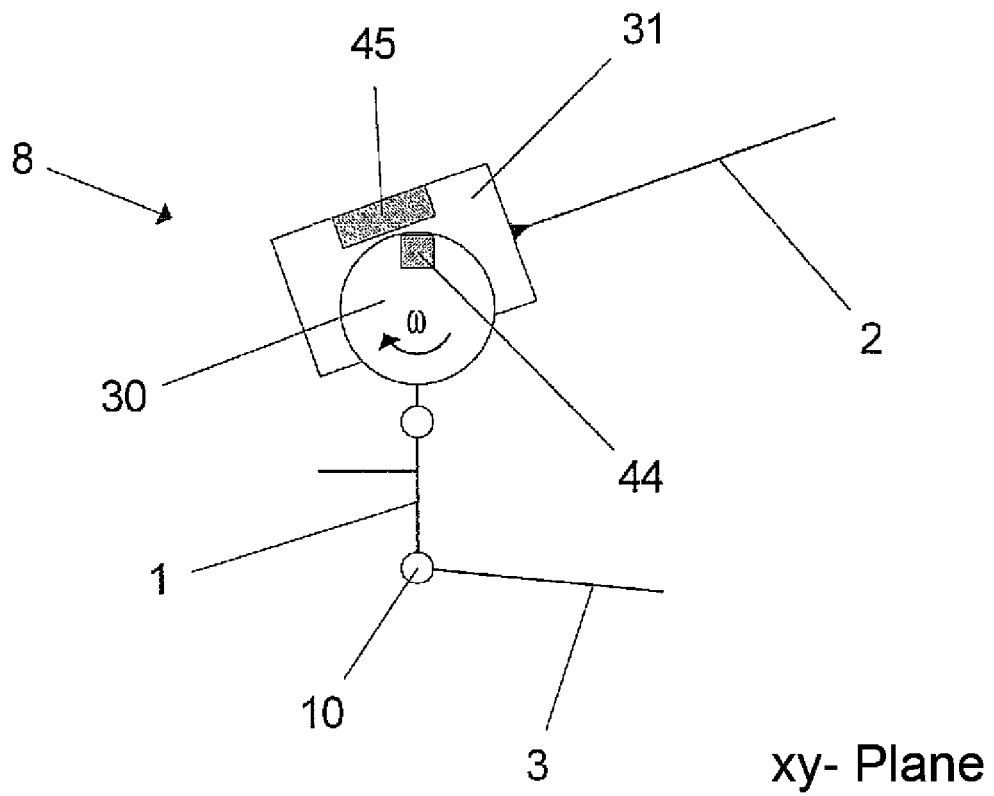
FIG. 4 is the upper suspension arm according to FIG. 1 with a schematic view of a second ball and socket joint with integrated angle-measuring device.

FIG. 4 shows a schematic view of the ball and socket joint 8, which has a ball pivot 30 and a ball and socket joint housing 31, in which the ball pivot 30 is mounted rotatably and pivotably. A permanent magnet 44 is arranged in the ball pivot 30, whereas a magnetic field-sensitive sensor 45 is provided in the ball and socket joint housing 31. The magnet 44 and the magnetic field-sensitive sensor 45 together form a second angle-measuring device, which is integrated in the ball and socket joint 8. As an alternative, the second angle-measuring device formed from the magnet 44 and the magnetic field-sensitive sensor 45 may also be integrated in the ball and socket joint 12. The ball and socket joint housing 31 is connected especially rigidly to the upper suspension arm 2, whereas the ball pivot 30 is preferably connected rigidly to the wheel carrier 1 or vice versa. The track angle δ can be derived by means of the angle ω, which is obtained by means of the second angle-measuring device and which is assumed by the upper suspension arm 2, e.g., in the xy plane, relative to the wheel carrier 1.

Furthermore, the king pin angle γ can be determined from the angle or angles measured in the ball and socket joint 10 by means of the first angle-measuring device as well as from the known kinematics of the wheel suspension. As an alternative, the king pin angle γ can also be determined from two wheel deflection positions $z_{rel}$, which are determined, e.g., for the two wheels of an axle of the motor vehicle. The front vehicle axle is indicated by the broken line 32 in FIG. 1, wheel 14 forming the left wheel of the axle 32. As is apparent from FIG. 9, a wheel 33 forms the right wheel of the vehicle axle 32, which [wheel] is connected to the vehicle body construction 6 with a wheel suspension 47 according to the present invention, which is shown, however, in a simplified form.

Figure 5:
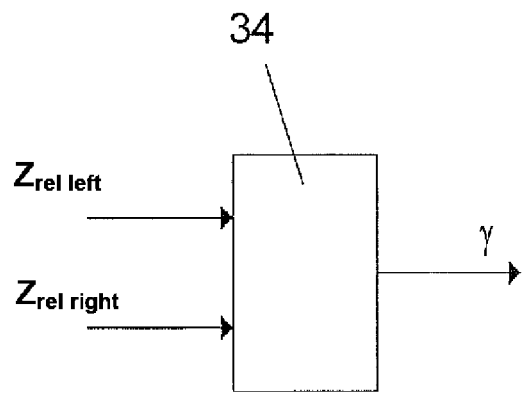
FIG. 5 is a block diagram for determining the king pin angle and/or the roll angle.

FIG. 5 schematically shows the alternative determination of the king pin angle γ, wherein the wheel deflection position $z_{rel}$ obtained from the ball and socket joint 10 is designated by $z_{rel,\,left}$ here. The value $z_{rel,\,right}$, which is an indicator of the deflection position of wheel 33 in relation to the vehicle body construction 6 or the corresponding carrier element, is obtained from a ball and socket joint of the wheel suspension for the right wheel 33, which said ball and socket joint corresponds to the ball and socket joint 10. The two variables $z_{rel,\,left}$ and $z_{rel,\,right}$ are sent to a computing unit 34, which can determine the king pin angle γ for both wheels 14 and 33 as well as optionally the roll angle of the axle 32. The computing unit 34 is preferably integrated here in the evaluating device 29 or is formed by same.

Figure 6:
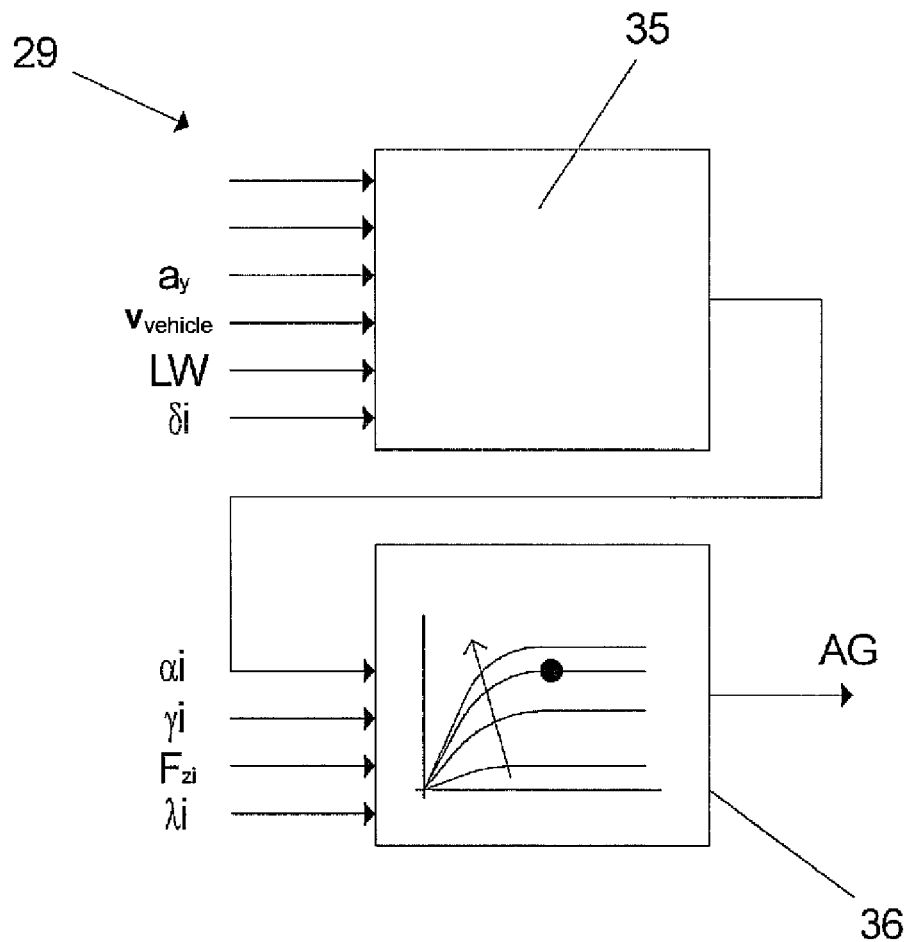
FIG. 6 is a partial block diagram of the evaluating device according to FIG. 1.

FIG. 6 shows a schematic block diagram of part of the evaluating device 29, which has an estimator unit 35 and a tire characteristic diagram unit 36, in which at least one tire characteristic diagram for the wheel 14, but preferably a plurality of tire characteristic diagrams for a plurality of wheels, especially for all four wheels of the motor vehicle 7, are stored in a memory. Especially the lateral acceleration $a_y$ of the vehicle, the speed $V_{vehicle}$ of the vehicle, the steering angle LW of the steering wheel 37 (see FIG. 9), as well as the track angle $δ_i$ for each wheel are sent as input variables to the estimator unit 35, the vehicle lateral acceleration $a_y$ and the vehicle speed $V_{vehicle}$ being determined by means of sensors 38 and 39 arranged additionally in the motor vehicle 7, which are likewise connected electrically to the evaluating device 29. The sensor 38 measures the lateral acceleration $a_y$, whereas the sensor 39 determines the vehicle speed $V_{vehicle}$. Furthermore, a sensor 40, which is likewise arranged in the vehicle 7 and is electrically connected to the evaluating device 29, is provided for measuring the steering angle LW. The track angle $δ_i$ is determined by a computing unit, which is preferably integrated in the evaluating device 29 or is formed by same.

The estimator unit 35 determines the king pin inclination $α_i$ for each wheel on the basis of these input variables and sends these king pin inclinations $α_i$ to the tire characteristic diagram unit 36 as an input variable. Furthermore, e.g., the king pin angle $γ_i$, the wheel load $Fz_i$ as well as the longitudinal slip $λ_i$ for each wheel are sent to the tire characteristic diagram unit 36. On the basis of these input variables, the tire characteristic diagram unit 36 now determines the working point of the particular wheel in the tire characteristic diagram, which [working point] is schematically indicated in FIG. 6 as a bold dot in the tire characteristic diagram unit 36. Different values, which characterize the force potential of the tire and can be sent as an output variable AG by the tire characteristic diagram unit 36, can be determined from this. The wheel load $Fz_i$ and the king pin angle $γ_i$ are determined by a computing unit each, which is preferably integrated in the evaluating device or is formed by same.

The subscript i in the variables $\delta_i$, $\alpha_i$, $Fz_i$ and $\lambda_i$ represents the particular wheel being considered. For example, the value i=1 represents wheel 14 and the value i=2 represents wheel 33. Furthermore, a sensor, especially a speed sensor 46, which is electrically connected to the evaluating device 29, is preferably used for each wheel to determine the longitudinal slip $\lambda_i$ in the motor vehicle 7.

Figure 9:
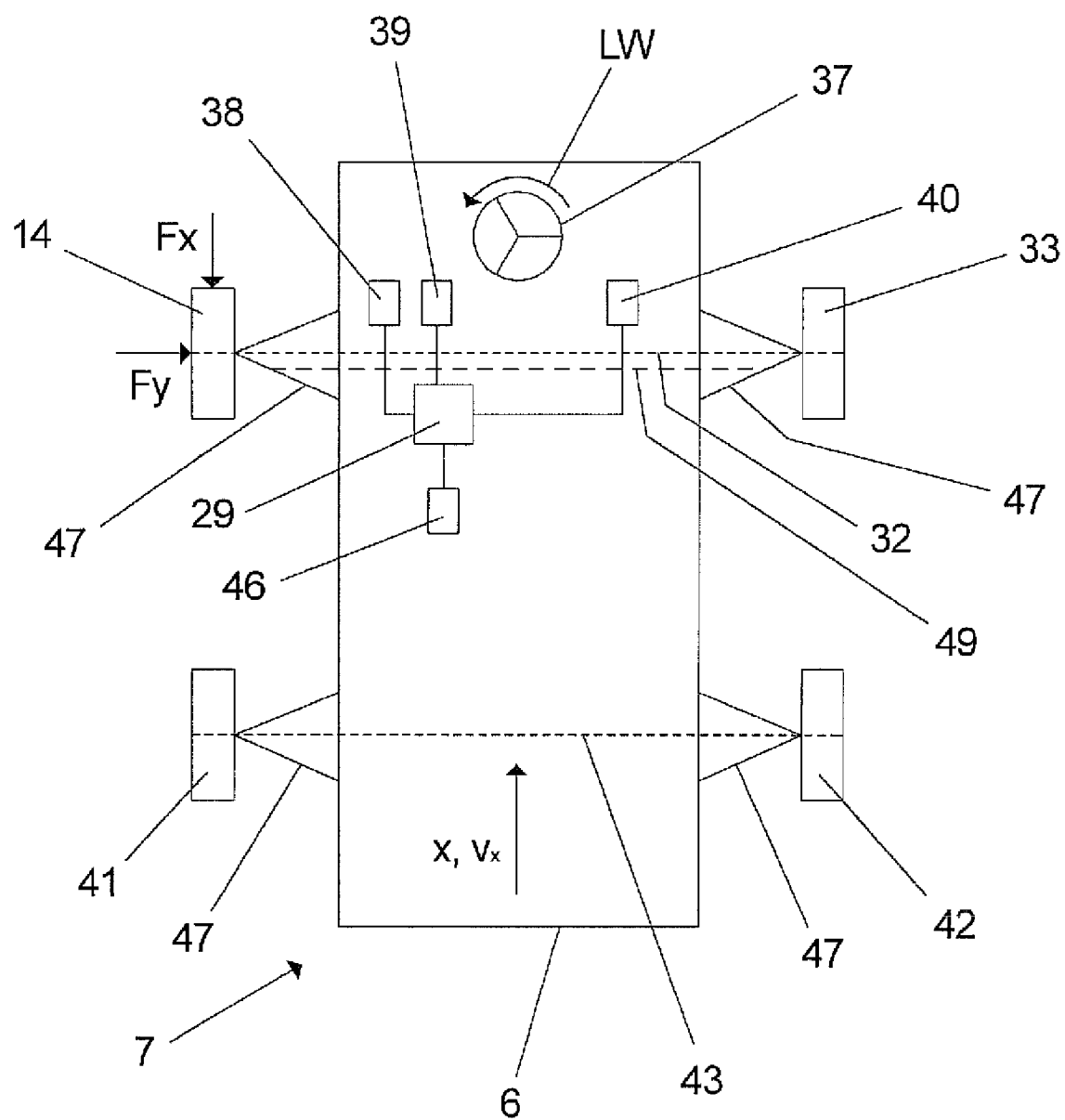
FIG. 9 is a schematic top view of a motor vehicle with a wheel suspension according to FIG. 1.

For example, a vehicle stability single-track model, by means of which the king pin inclination $\alpha_i$ of the particular wheel can be determined, is stored in the estimator unit 35. Even though the evaluating device 29 was described here with reference to a plurality of wheels, it is also possible that only one wheel, especially wheel 14 alone is considered. The subscript i can be eliminated in this case or made to equal 1 for all variables. However, the force potential is preferably determined for at least two and especially for all tires or wheels of the motor vehicle 7. The subscript 1 can range from 1 to 4 in this case, the value i=3 representing a third wheel 41 and the subscript i=4 representing the fourth wheel 42. The wheels 41 and 42 shown in FIG. 9 are associated with a second vehicle axle 43, which forms the rear axle of the motor vehicle 7 according to this embodiment.

Figure 7:
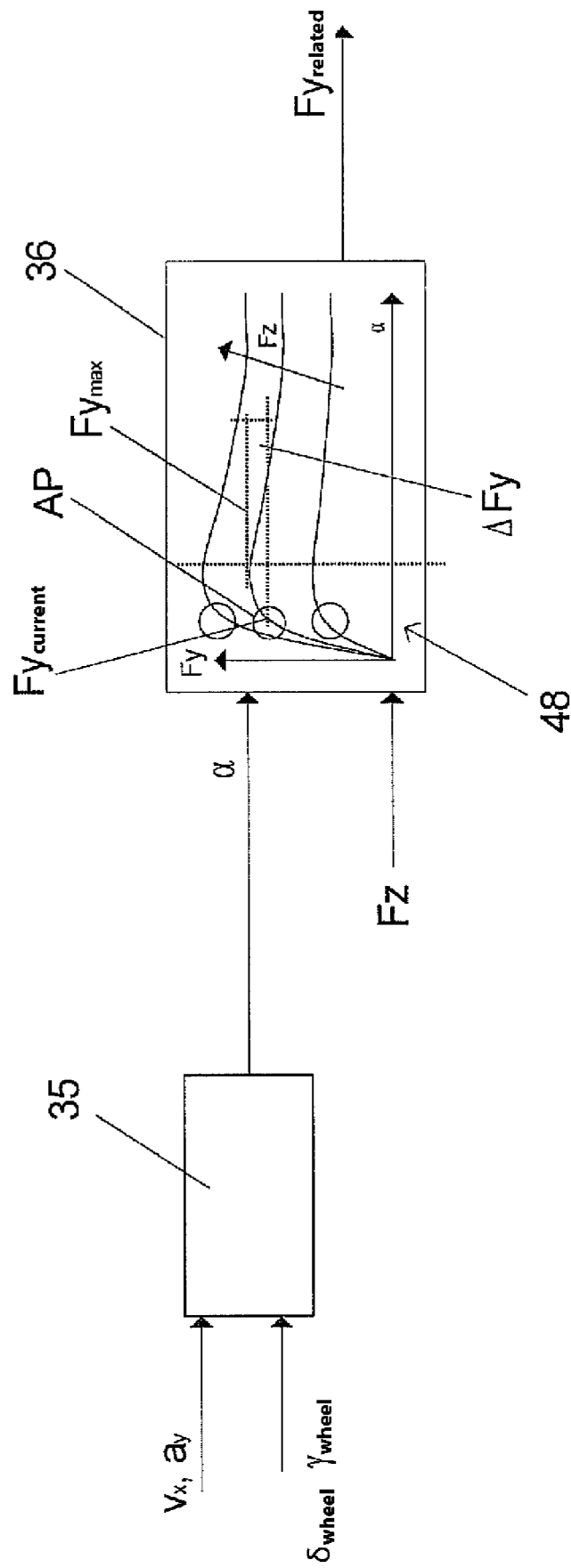
FIG. 7 is a block diagram of the force reserve or load factor of the wheel according to a first variant of the evaluating device.
Figure 8:
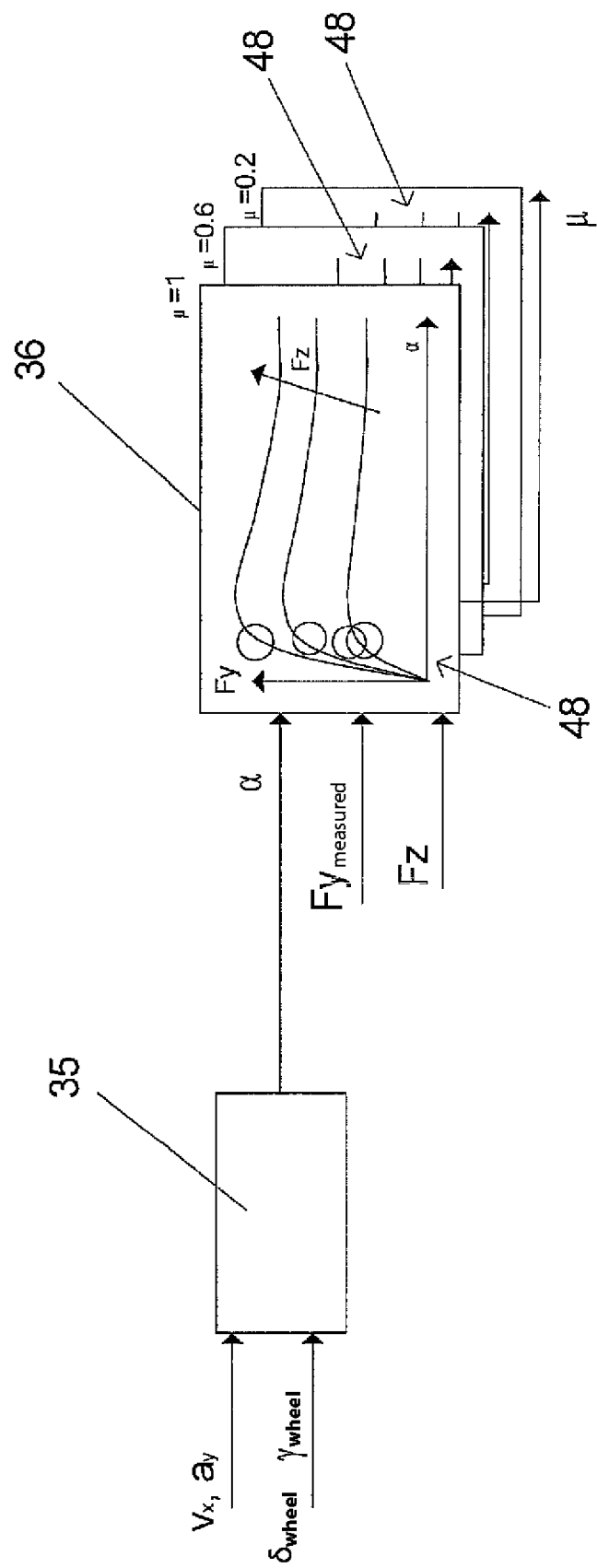
FIG. 8 is a block diagram for determining the coefficient of friction between the wheel and the road surface according to a second variant of the evaluating device.

The evaluating device 29 may be embodied in different ways, two variants being shown in FIGS. 7 and 8. According to the first variant according to FIG. 7, the vehicle speed in the x direction, $v_x$, the lateral acceleration $a_y$, the track angle $\delta_{WHEEL}$ of wheel 14 as well as the king pin angle $\gamma_{WHEEL}$ of wheel 14 are sent to the estimator unit 35, which is embodied according to this embodiment in the form of a real-time computing model. The real-time computing model or the estimator unit 35 determines on the basis of these variables the king pin inclination $\alpha$ of wheel 14, which angle is sent as an input variable to the tire characteristic diagram unit 36. Furthermore, the wheel load $F_z$ acting on wheel 14 or an approximate value thereof is sent as an input variable to the tire characteristic diagram unit 36, which determines the working point AP of wheel 14 on the basis of the two variables $\alpha$ and Fz in the tire characteristic diagram 48, which is shown schematically as a plurality of curves. The current lateral force (side force) $Fy_{current}$, which has a distance $\delta Fy$ from the maximum allowable, transmissible lateral force $Fy_{max}$, is obtained from the working point AP. The quotient of $Fy_{current}$ and $Fy_{max}$ is formed now and made available by the tire characteristic diagram unit 36 as a related lateral force $Fy_{related}$ as an output variable ($Fy_{related}=Fy_{current}/Fy_{max}$, with Fz=const.).

Thus, a value, which characterizes the load factor of the wheel or tire force potential as well as the absolute value of the corresponding tire force, is available as an output variable to the tire characteristic diagram unit 36 or the evaluating device 29. This output variable $Fy_{related}$ (optionally also $\delta Fy$) can then be used as an input variable for further regulating and/or control devices in the motor vehicle 7. The first variant is preferably used in case of a constant (high) coefficient of friction.

FIG. 8 shows a second variant of the evaluating device 29, where the same variables as those according to FIG. 7 are sent to the estimator unit 35. However, compared to FIG. 7, the lateral force $Fy_{measured}$ measured at wheel 14 is additionally sent to the tire characteristic diagram unit 36 as an input variable, which is determined, e.g., on the basis of one or more measured values, which are provided by one or both angle-measuring devices or by a separate sensor. The evaluating device 29 may have for this purpose an additional computing unit, which is not shown here and may also be formed by the evaluating device 29 itself. A lateral force $Fy_{calculated}$ can then be determined by the tire characteristic diagram unit 36 in the tire characteristic diagram 48 on the basis of the input variables king pin inclination $\alpha$ and wheel load (or approximate value) Fz as well as preferably the measured lateral force $Fy_{measured}$. If this determination shows, e.g., that the measured lateral force $Fy_{measured}$ is below the determined or calculated lateral force $Fy_{calculated}$, the instantaneous coefficient of friction $\mu$, which occurs between the tire 14 and the road surface 16 in the wheel contact point 15, is reduced. Another characteristic diagram with changed $\mu$ is now valid, or the working point would change in a multidimensional characteristic diagram, in which $\mu$ forms a parameter.

A plurality of tire characteristic diagrams 48 for different coefficients of friction $\mu$ or the above-mentioned multidimensional characteristic diagram can be stored in the memory in the tire characteristic diagram unit 36, so that the working point AP can be determined in one of these characteristic diagrams, from which the current coefficient of friction $\mu$ can be derived or estimated. Furthermore, the ratio of $Fy_{max,\ transmissible}/Fz$ of the maximum transmissible lateral force $Fy_{max,\ transmissible}$ to the wheel load Fz can be determined. The determined variables or ratios $\mu$, $Fy_{calculated}$, $Fy_{measured}$ and/or $Fy_{max,\ transmissible}/Fz$ can then be sent from output variables by the evaluating device 29 or the tire characteristic diagram unit 36 and they characterize the load factor of the wheel or tire force potential. A good estimated value for the current coefficient of friction $\mu$ can then be sent as an input variable to a chassis control system, which is preferably connected to the evaluating device 29, e.g., to a controlled brake or to an active steering.

The variants shown in FIGS. 7 and 8 are only exemplary, so that other variables characterizing the force potential of the tire can be determined and sent by the evaluating device 29 as well. It is also possible to combine the two variants with one another. Furthermore, other vehicle variables, e.g., the longitudinal acceleration $a_x$, the yaw angle $\psi$ as well as the time derivative of the yaw angle $d\psi/dt$ may also be sent as input variables to the evaluating device 29, especially to the estimator unit 35, and additional sensors are or can be provided in the motor vehicle 7 for determining these additional variables.

The evaluating device 29 is preferably designed as a digital computer, and the computing units, the estimator unit 35 as well as the tire characteristic diagram unit 36 may be embodied by means of this digital computer. In addition, the digital computer can also perform all other calculations (e.g., Fz), time derivatives (e.g., $dz_{rel}/dt$), etc., which are useful or necessary for the evaluation of the data sent by the angle-measuring devices and optionally the other sensors.

FIG. 9 shows a simplified top view of the motor vehicle 7, wherein the four wheels 14, 33, 41 and 42 are connected to the vehicle body construction 6 via wheel suspensions 47 according to the present invention each, which are shown schematically. Furthermore, FIG. 9 shows the direction of travel x, the vehicle speed $v_x$ in direction x, the longitudinal force Fx acting on wheel 14 as well as the lateral force (side force) Fy acting on wheel 14.

A more accurate calculation of the vertical wheel load $F_Z$ or $F_{ZWHEEL}$ acting on wheel 14 shall finally also be explained, where it can be assumed that the axle 32 has a roll stabilizer or roll labilizer 49, which is schematically indicated in FIG. 9, and has a spring rate $c_{bar}$. Here, $m_{WHEEL}$ corresponds to the unsprung weight of the wheel and $a_z$ to the absolute wheel carrier acceleration in the vertical direction. The following relationships apply:

$$Fz_{absorber} = k*dz_{rel}/dt$$

$$Fz_{spring} = c*z_{rel}$$

$$Fz_{bar} = (z_{rel\_left} - z_{rel\_right})*c_{bar}$$

$$Fz_{WHEEL\_force\ due\ to\ gravity} = m_{WHEEL}*a_z$$

$$Fz_{WHEEL\_weight} = m_{WHEEL}*g, \text{ in which } g \approx 9.81 \text{ m/sec}^2.$$

The wheel load Fz or $Fz_{WHEEL}$ is thus obtained as follows:

$$Fz_{WHEEL} = Fz_{WHEEL\_force\ due\ to\ gravity} + Fz_{WHEEL\_weight} + Fz_{absorber} + Fz_{spring} + Fz_{bar}.$$

It becomes clear from this that the above-described statement $Fz = j^2*(C)*z_{rel} + k*dz_{rel}/dt)$ represents an approximate solution only, which is, however, sufficient for certain applications. Nevertheless, it is also possible to use the more accurate calculation of the wheel load and perform this calculation, e.g., by means of the evaluating unit 29, but an acceleration sensor is preferably to be provided for this to determine $a_z$. Furthermore, depending on the transmission ratio j, it may be necessary to multiply $Fz_{absorber}$ and $Fz_{spring}$ by $j^2$.

It may happen, especially when the spring and the absorber are arranged at different locations in the wheel suspension, that a different transmission ratio applies to the spring than to the absorber. The transmission ratio for the spring can be designated by $j_F$ and the transmission ratio for the absorber by $j_D$ in this case. Now, $$Fz_{absorber} = j_D^2 * k * dz_{rel}/dt$$

$$Fz_{spring} = j_F^2 * z_{rel}.$$

Consequently the following applies to the approximate solution of Fz:

$$Fz = j_D^2 * k * dz_{rel}/dt + j_F^2 * C * Z_{rel}.$$

Even though these calculations were carried out with reference to wheel 14, they can also be applied to any other wheel of the motor vehicle.

The invention claimed is:

1. A process for using a wheel suspension, the process comprising the steps of:
    providing a wheel suspension connected to a vehicle body construction, said wheel suspension comprising a carrier element, a wheel carrier arranged at a spaced location from said carrier element, a wheel mounted rotatably at said wheel carrier, a first guide means, a first pivotable connection means, a second guide means, a second pivotable connection means, said wheel carrier being connected to said carrier element via said first guide means and via said first pivotable connection means, said wheel carrier being connected to said carrier element via said second guide means and via said second pivotable connection means;
    providing a first angle-measuring device integrated in said first pivotable connection means;
    providing a second angle-measuring device integrated in said second pivotable connection means
    determining a first measured value by means of said first angle-measuring device;
    determining a second measured value by means of said second angle-measuring device; and
    determining a track angle and a king pin angle of the wheel based on the two measured values.

2. A process for using a wheel suspension in accordance with claim 1, wherein a wheel load acting on said wheel or an approximate value thereof is determined based on the two measured values.

3. A process for using a wheel suspension in accordance with claim 1, further comprising determining a lateral force acting on said wheel.

4. A process for using a wheel suspension in accordance with claim 1, wherein lateral acceleration and speed of said wheel are measured and a king pin inclination of said wheel is determined based on said track angle, said king pin angle, said lateral acceleration and said speed.

5. A process for using a wheel suspension, the process comprising the steps of:
    providing a wheel suspension connected to a vehicle body construction, said wheel suspension comprising a carrier element, a wheel carrier arranged at a spaced location from said carrier element, a wheel mounted rotatably at said wheel carrier, a first guide means, a first pivotable connection means, a second guide means, a second pivotable connection means, said wheel carrier being connected to said carrier element via said first guide means and via said first pivotable connection means, said wheel carrier being connected to said carrier element via said second guide means and via said second pivotable connection means;
    providing a first angle-measuring device integrated in said first pivotable connection means;
    providing a second angle-measuring device integrated in said second pivotable connection means
    determining a first measured value by means of said first angle-measuring device;
    determining a second measured value by means of said second angle-measuring device; and
    determining a track angle and a king pin angle of the wheel based on the two measured values, wherein one or more of a remaining force reserve of said wheel and a current coefficient of friction between a road surface and said wheel that is in contact with said road surface are determined based on said king pin inclination.

* * * * *